(12) United States Patent
Strots et al.

(10) Patent No.: US 8,302,389 B2
(45) Date of Patent: Nov. 6, 2012

(54) UREA SCR DIESEL AFTERTREATMENT SYSTEM

(75) Inventors: Vadim Strots, Forest Park, IL (US); Paul L Berke, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 394 days.

(21) Appl. No.: 12/624,104

(22) Filed: Nov. 23, 2009

(65) Prior Publication Data

US 2011/0120097 A1 May 26, 2011

(51) Int. Cl.
*F01N 3/00* (2006.01)
(52) U.S. Cl. ............................................. 60/301; 60/311
(58) Field of Classification Search .................... 60/286, 60/287, 301, 311, 324; 220/562, 563; 422/171, 422/177, 180, 168; 55/350.1, 410, 482, 484, 55/DIG. 30
See application file for complete search history.

(56) References Cited

U.S. PATENT DOCUMENTS

| 6,725,652 | B2 * | 4/2004 | Sakaguchi | 60/297 |
|---|---|---|---|---|
| 6,837,336 | B2 * | 1/2005 | Gault et al. | 181/258 |
| 7,273,592 | B2 * | 9/2007 | Jacob et al. | 422/169 |
| 7,293,408 | B2 * | 11/2007 | Kohler et al. | 60/286 |
| RE41,142 | E * | 2/2010 | Blair et al. | 220/581 |
| 7,866,143 | B2 * | 1/2011 | Buhmann et al. | 60/286 |
| 2004/0093856 | A1 * | 5/2004 | Dingle et al. | 60/286 |
| 2006/0153748 | A1 * | 7/2006 | Huthwohl et al. | 422/172 |
| 2006/0156712 | A1 * | 7/2006 | Buhmann et al. | 60/297 |
| 2008/0127635 | A1 * | 6/2008 | Hirata et al. | 60/286 |
| 2009/0293467 | A1 * | 12/2009 | Boeckenhoff | 60/324 |

* cited by examiner

*Primary Examiner* — Thomas E. Denion
*Assistant Examiner* — Patrick Maines
(74) *Attorney, Agent, or Firm* — Mark C. Bach; Jeffrey P. Calfa

(57) ABSTRACT

A device and method for catalytic reduction of NOx in gaseous products of a combustion process before entry into the atmosphere. The gaseous and particulate products of a combustion process flow radially through a radial flow particulate filter element (24) that is effective to trap particulate matter, and are then directed axially through a collector (26). An injector (30) introduces a reductant into an axial end of the collector for entrainment with axial flow through the collector in a direction away from the injector. Flow leaving the collector is directed through an SCR catalyst (40) where catalytic reduction of NOx occurs.

2 Claims, 3 Drawing Sheets

UREA SCR DIESEL AFTERTREATMENT SYSTEM

TECHNICAL FIELD

This disclosure relates to internal combustion engines, especially diesel engines like those used to propel large trucks, and in particular the disclosure relates to the treatment of diesel exhaust (sometimes referred to simply as after-treatment or exhaust after-treatment) using a particulate filter, a urea injector and an SCR (selective catalytic reduction) catalyst.

BACKGROUND OF THE DISCLOSURE

Diesel engine after-treatment systems that use selective catalytic reduction (SCR) are generally rather large, typically using long exhaust pipes in order to completely evaporate injected aqueous urea solution and sufficiently mix the injected solution with the exhaust gas. For that reason, packaging such a system poses a challenge to vehicle engineers and designers, and adds weight and cost to a vehicle.

Furthermore, heat losses through the system walls to the outside environment may lead to incomplete evaporation of the injected urea solution, incomplete conversion of urea into ammonia, and the formation of solid deposits in the exhaust system, all of which are typically to be avoided because they have adverse effects on the life and performance of the after-treatment system.

Because it is conventional design practice to place a urea injector downstream of a particulate filter, the injector is at times (e.g., during active regeneration of the DPF, either controlled or uncontrolled) exposed to exhaust gas temperatures that may exceed the allowable maximum temperature for which the injector is designed, and consequently the injector may be damaged over time because of such repeated exposure.

One way to reduce the overall size of an after-treatment system is by improving the efficiency with which injected urea solution is evaporated. Greatly increasing the surface area of solution entraining with exhaust gas flow, such as by using compressed air to reduce the size of spray droplets while greatly multiplying their number, increases evaporation efficiency. Although that is one way to reduce the size of the after-treatment system, a source of compressed air may not be present as existing equipment in some vehicles, and if an auxiliary air compressor is added to provide the compressed air source, it too will be packaged in the vehicle and that of course would add to the cost of the after-treatment system as well as consume energy from the engine to compress air.

An alternative to using compressed air is to evaporate urea outside of the exhaust line and inject ammonia gas, such as described in SAE (Society of Automotive Engineers) paper 2006-01-0642, but that too adds to the after-treatment system cost and involves somewhat bulky equipment that will also be packaged in the vehicle.

While insulation (dual-wall exhaust pipe, for example) can reduce heat losses that could otherwise impair evaporation efficiency, insulation doesn't provide a total solution, and it too adds to the after-treatment system cost.

SUMMARY OF THE DISCLOSURE

The present disclosure provides a solution for the above-stated problems through a novel organization and arrangement of a diesel particulate filter, a urea injector, and an SCR catalyst in a diesel exhaust after-treatment system.

The applicants have discovered that by arranging the urea injector at one axial end of a generally cylindrical collector that is circumferentially surrounded at least in part, and for example fully, by a radial flow particulate filter through which exhaust gas that is to be treated flows radially inward to enter the interior of the collector and flow therethrough away from the injector toward the catalyst, evaporation efficiency can be increased, allowing the overall system length to be significantly shortened, and the injector is exposed to less severe conditions because its new location removes it from the flow of filtered exhaust gases leaving the particulate filter.

Urea solution is injected as a spray into the one axial end of the collector at a suitable rate and velocity so that urea droplets in the spray entrain and mix with filtered exhaust gas that is moving through the collector axially away from the injector. By confining the spray in this way, droplets in the spray largely avoid contact with an outside wall of the after-treatment system that surrounds the particulate filter element before they evaporate. If the gas flow exiting the collector at the axial end opposite the injector still carries any entrained, not-yet evaporated, spray droplets, the flow momentum tends to keep the droplets moving largely axially and centrally of the surrounding wall. Consequently, this arrangement minimizes, and ideally avoids, droplet contact with interior wall surfaces that are potentially susceptible to film formation and deposits.

The after-treatment system may also include structural features that break up urea droplets even further, re-directing the broken-up droplets for improved mixing of the injected solution in the exhaust gas flow. While the particulate filter element may be supported within the after-treatment system in any suitably appropriate way, the collector may comprise a permeable wall against which the radially inner surface of the particulate filter element is disposed. Re-directed urea droplets that strike that wall will evaporate because it is an interior wall that is continually exposed on both surfaces to hot exhaust gas. The particulate filter element, urea injector, and collector are organized and arranged in such a way as to promote the objective of attaining both complete evaporation of urea solution and substantially uniform mixing of gaseous urea decomposition products (ammonia, isocyanic acid, etc.) within the exhaust gas before the flow reaches the SCR catalyst.

Moreover, because the location of the urea injector avoids its direct exposure to the exhaust gas entering the collector, it enjoys less heat exchange with hot exhaust gas that can elevate its temperature, thereby better limiting injector temperature.

The disclosed after-treatment system provides NOx reduction performance similar to that of known systems. While soot filtration performance is dependent on the filter material, the system can provide compliance with relevant after-treatment regulations. The gas flow inlet into the system is connected to the existing engine exhaust pipe, and the outlet of the system is connected to the vehicle tailpipe. The pressure drop across the after-treatment system is comparable to that of known systems, or perhaps even somewhat less. Urea consumption, storage, and delivery are the same as in known systems.

A general aspect of the disclosure relates to an internal combustion engine comprising an exhaust system through which exhaust gas created by combustion in engine combustion chambers passes to atmosphere and which comprises an after-treatment device that treats the exhaust gas before the exhaust gas leaves the exhaust system.

The after-treatment device comprises: an inlet through which exhaust gas enters the device and an outlet through which exhaust gas that has passed through the device exits the device; a radial flow particulate filter element that is disposed in at least partially circumscribing relationship to an axially extending collector to filter particulate matter from exhaust gas that has entered the device through the inlet before the exhaust gas enters and flows axially through the collector; and an injector for injecting material useful in accomplishing treatment of the exhaust gas into an axial end of the collector for entrainment with exhaust gas flow axially through the collector.

A more specific aspect is that the injected material is a reductant, such as urea solution or ammonia, that is substantially fully evaporated before arriving at an SCR catalyst that is downstream of the particulate filter element.

Another general aspect relates to a device for reducing NOx in gaseous products of a combustion process before entering the atmosphere.

The device comprises a construction and arrangement: that causes the products of combustion to flow along a flow path containing a radial flow particulate filter element that has an exit surface extending along an axially extending collector and that is effective to filter particulate matter from the products of combustion as the products of combustion pass radially through the filter element, enter the collector through the exit surface, and continue along the flow path through the collector, and that has an injector arranged to introduce a reductant into an axial end of the collector for entrainment with flow through the collector in a direction away from the injector and an SCR catalyst disposed in the flow path downstream of the collector to provide for the reductant to reduce NOx in the products of combustion by catalytic action provided by the SCR catalyst.

Still another general aspect relates to a method for catalytic reduction of NOx in gaseous products of a combustion process before entry into the atmosphere.

The method comprises directing the products of the combustion process to flow radially through a radial flow particulate filter element that is effective to trap particulate matter, then directing flow leaving the filter element axially through a collector, causing an injector to introduce a reductant into an axial end of the collector for entrainment with axial flow through the collector in a direction away from the injector, and subsequently directing flow leaving the collector through an SCR catalyst where catalytic reduction of NOx occurs.

The foregoing summary, accompanied by further detail of the disclosure, will be presented in the Detailed Description below with reference to the following drawings that are part of this disclosure.

DETAILED DESCRIPTION

Figure 1:
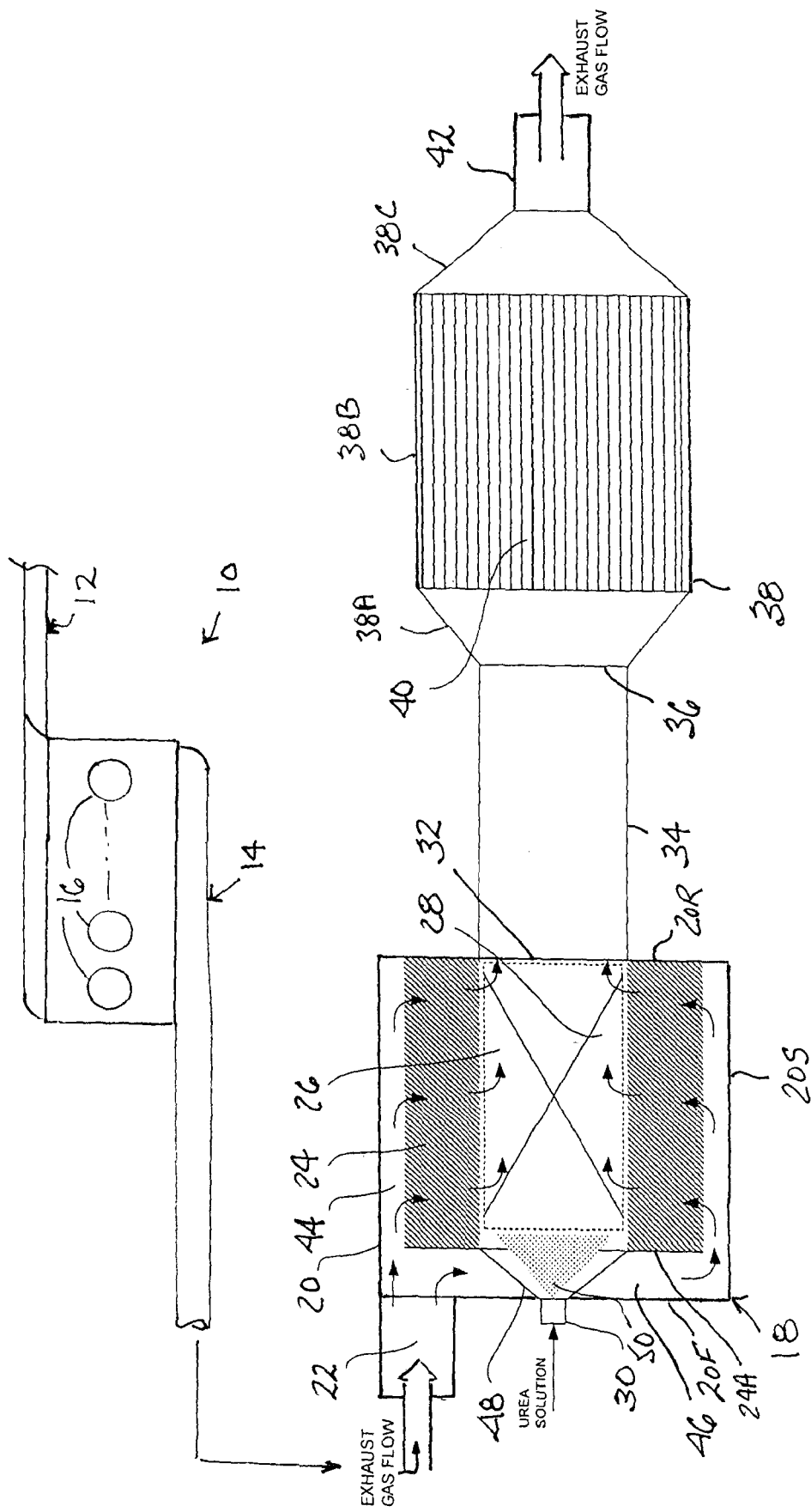
FIG. 1 is a diagram that shows a first embodiment of after-treatment system of the present disclosure.

FIG. 1 shows an example of a turbocharged diesel engine 10 having an intake system 12 through which charge air enters and an exhaust system 14 through which exhaust gas resulting from combustion exits, not all details of those two systems that are typically present being shown. Engine 10 comprises a number of cylinders 16 forming combustion chambers into which fuel is injected by fuel injectors to combust with the charge air that has entered through intake system 12. Energy released by combustion powers the engine via pistons connected to a crankshaft.

When used in a motor vehicle, such as a truck, engine 10 is coupled through a drivetrain to driven wheels that propel the vehicle. Intake valves control the admission of charge air into cylinders 16, and exhaust valves control the outflow of exhaust gas through exhaust system 14 and ultimately to atmosphere. Before entering the atmosphere however, the exhaust gas is treated by one or more after-treatment devices in an after-treatment system 18.

The after-treatment system shown in FIG. 1 comprises a housing 20 having an exhaust gas inlet 22 for exhaust gas passing through exhaust system 14 from cylinders 16. The interior of housing contains a particulate filter element 24, a gas collector 26, and a urea injector 30. Housing 20 also has a gas outlet 32 through which exhaust gas can pass into one end of a pipe 34 from whose opposite end the exhaust gas conveyed through the pipe enters an inlet 36 at one axial end of a housing 38 that contains an SCR catalyst 40 and that has an exhaust gas outlet 42 at the opposite axial end.

Housing 20 has a front wall 20F forming a front axial face, a rear wall 20R forming a rear axial face, and a cylindrical side wall 20S that extends between the front and rear walls and can assume any of various cross sectional shapes, including circular and oval shapes.

Filter element 24 is constructed for radial flow and has a tubular shape that fully circumscribes collector 26. It is supported in any suitably appropriate manner within housing 20 so as to provide for exhaust gas that has entered through inlet 22 to flow radially through the filter element from the outer surface to the inner surface as suggested by the unnumbered flow arrows. The outer surface of the filter element is spaced inward of side wall 20S to provide an annular space 44 surrounding the filter element along its axial length. The axial end of the filter element that confronts wall 20F is spaced from that wall to provide a space 46 that promotes more uniform distribution of exhaust gas around the filter element. An imperforate wall 24A covering that axial end of the filter element prevents exhaust gas from entering the filter element via space 46. Collectively, spaces 44 and 46 distribute the entering exhaust gas flow within housing 20 for reasonably uniform radial flow through filter element 24.

The particular construction of filter element 24 employs any available technology appropriate for trapping certain constituents in diesel exhaust gas, a principal one of which is soot. Examples of such technologies are metallic or ceramic foam or metallic or ceramic fleece composed of a single layer or several layers that possess different filtration properties for soot filtration and distribution within the filter element. Furthermore, the filter element can be fully or partially coated with oxidation catalyst that oxidizes hydrocarbons and the soluble organic fraction of diesel soot for any of several purposes including compliance with tailpipe emission regulations, increasing exhaust gas temperature for filter element regeneration, preheating the SCR catalyst, and oxidizing NO into $NO_2$ in order to a) promote $NO_2$-induced soot oxidation and b) create a NO-to-$NO_2$ ratio favorable for SCR catalyst reaction.

The one axial end of a wall 48 is disposed in surrounding relation to an outlet of urea injector 30. Wall 48, which is shown frustoconical only as a possible example of its shape, can actually be a flange extending from the injector body, or alternately can be a separate piece that abuts wall 20F around an opening in that wall where the injector is mounted. The larger axial end of wall 48 is disposed against the imperforate annular wall 24A covering the axial end of filter element 24 that confronts wall 20F, but the open center of annular wall 24A is open to the larger axial end of wall 48. A cooling element that provides for air or thermal fluid cooling, or both, may be associated with wall 48 to provide added cooling for the urea injector, if needed.

The urea injector has a nozzle that lies substantially on an imaginary centerline through the collector for injecting urea solution as a spray 50 that passes through the open center of annular wall 24A and into gas collector 26 to mix with the filtered exhaust flowing axially through the collector. The urea solution has approximately a 32.5% concentration by weight.

The transverse cross-section of the gas collector can be circular, oval, or any other appropriate shape dictated by urea/gas mixing and/or packaging constraints. The gas collector can also have a permeable wall that is used in full or partial support of filter element 24. Upon exiting the nozzle of injector 30, the urea solution spray enters the open axial end of gas collector 26 that faces the injector.

The after-treatment device may have features that promote rapid evaporation of droplets in the urea solution spray and mixing with the exhaust gas flow for downstream SCR catalyst performance while preventing liquid urea solution from impinging on the front entrance face of SCR catalyst 40. While various constructions for mixer features are contemplated, each should strive to promote quick and total evaporation of the urea solution and uniform distribution of evaporated reductant throughout the exhaust gas flow.

Figure 5:
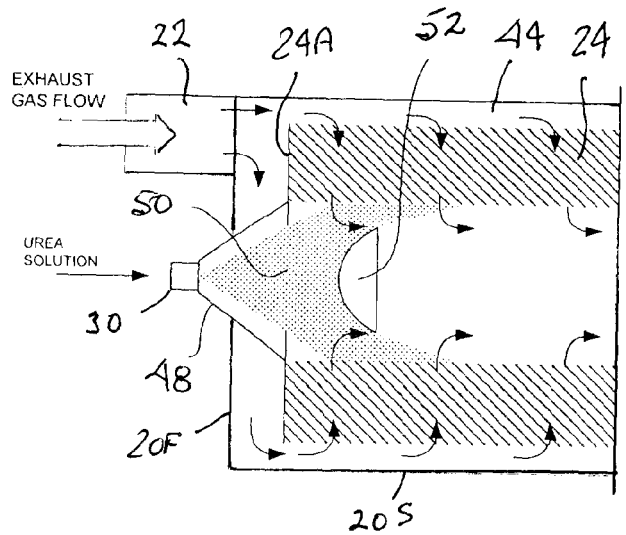
FIG. 5 is a diagram showing a modification that may be made to any of the foregoing embodiments.

FIG. 5 shows an example of a mixer element 52 disposed to intercept urea solution spray droplets passing through the central zone of gas collector 26. The specific element is a surface shown as convex, but other geometries and constructions, such as wiremesh or metallic foam inserts, are contemplated. Surfaces of such internal mixer features disposed in the paths of urea droplets may be coated or etched to promote urea evaporation and hydrolysis. Such features are intended to deflect/disperse/break up spray droplets and especially to ensure that there is no trapping of the injected liquid droplets in the area adjacent the nozzle because trapping can lead to deposits that may cause eventual plugging of the injector nozzle.

By placing the urea injector in proximity to the after-treatment system inlet so that the urea spray is injected upstream of where the exhaust gas leaves the filter element, overall system length can be shortened, by even as much as from about 10 inches to about 50 inches. That location also minimizes heat exchange with the gas flow, thereby limiting the temperature to which the injector is exposed. FIG. 5 shows wall 48 having an axial length selected to place the injector nozzle at a distance from wall 20F in order to provide further protection against excessive temperatures. In the various embodiments shown in the Figures, the urea injector is disposed axially beyond the gas collector relative to the SCR catalyst.

By injecting urea solution into an exhaust gas collector surrounded by radial flow particulate filter material, direct contact of urea droplets with an external wall of the after-treatment system is significantly avoided. The exhaust gas flow emanating from the radially inner surface of the particulate filter element keeps droplets of sprayed urea solution away but would quickly dislodge and evaporate any droplets that reach the filter element, or the permeable collector wall if present, thus minimizing or eliminating wall film formation. If the gas collector has such a wall, it is an inner wall that is exposed to exhaust gas heat on both surfaces, another factor in resisting film formation on it.

SCR catalyst 40 promotes the reaction of exhaust gas constituents with the decomposition products of urea solution evaporation. The catalyst of FIG. 1 is constructed for axial flow and is fit to an intermediate side wall portion 38B of housing 38. A frustoconical entrance wall portion 38A extends with increasing taper from the downstream end of pipe 34 to side wall portion 38B. A frustoconical exit wall portion 38C extends from side wall portion 38B to outlet 42.

Figure 2:
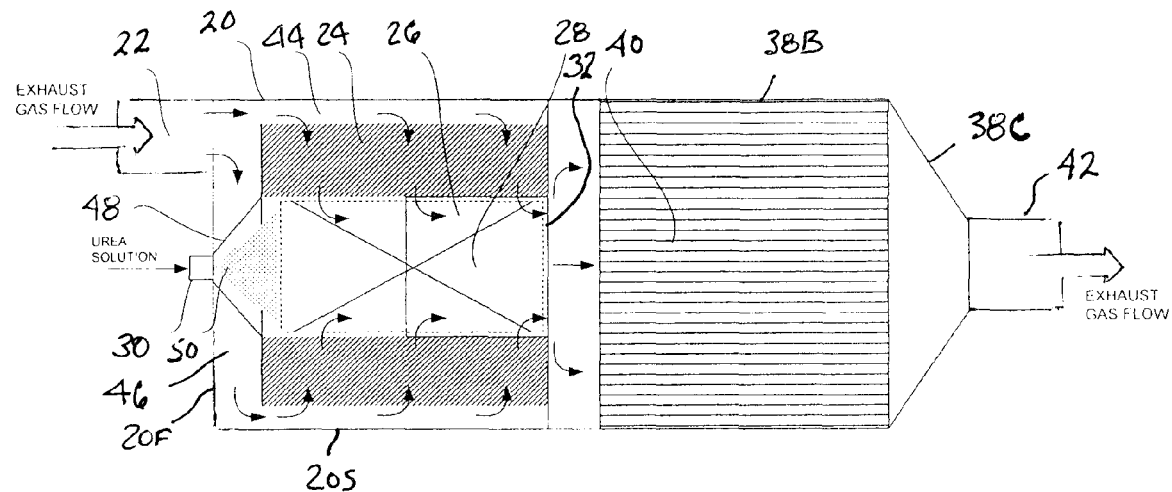
FIG. 2 is a diagram that shows a second embodiment of after-treatment system of the present disclosure.

The embodiment of FIG. 2 differs from that of FIG. 1 in that the two housings of FIG. 1 are replaced by a single one with SCR catalyst 40 being disposed closer to the open downstream end of collector 26, but spaced axially therefrom a distance that allows for distribution of the gas stream exiting the collector across the full face of the catalyst. This is an example of both substrates (particulate filter 24 and catalyst 40) being packaged in the same "can" rather than in separate "cans" as in FIG. 1. Although not shown in FIG. 2, a modified form may have a cone or another distribution device that enhances the uniformity of the gas flow entering the SCR catalyst from the collector.

Figure 3:
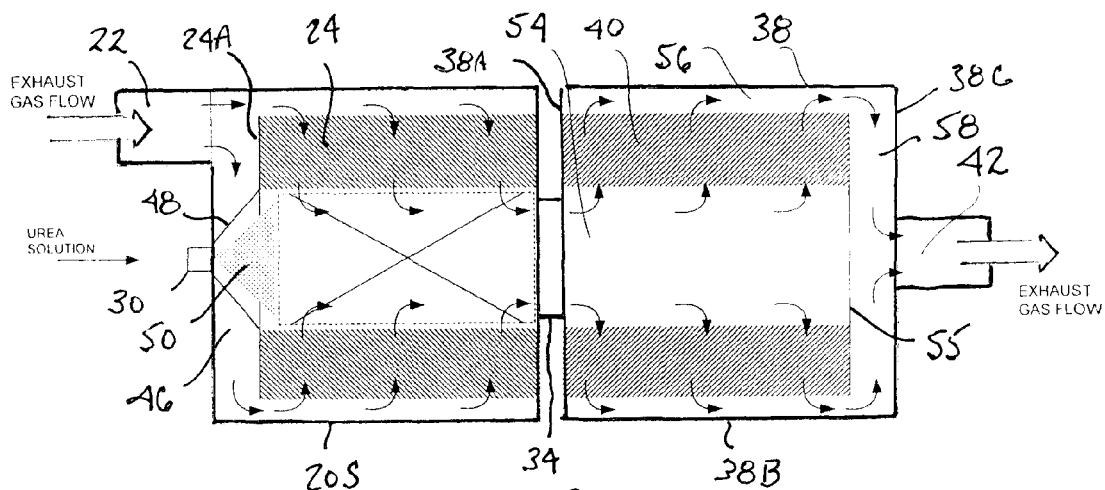
FIG. 3 is a diagram that shows a third embodiment of after-treatment system of the present disclosure.

FIG. 3 shows another "two-can" embodiment in which SCR catalyst 40 is constructed for radial flow and has a tubular, or annular, shape. Catalyst 40 is supported within housing 38 in any suitably appropriate way so as to place the open front axial end of the annular catalyst in direct communication with a central hole in end wall portion 38A to which pipe 34 is fit. The space circumscribed by the catalyst provides central gas distribution channel along the length of the catalyst. An imperforate wall 55 covers the rear axial end face of the catalyst including the corresponding end of the channel. The diameter of pipe 34 is fairly close to those of collector 26 and the inside of catalyst 40 so that exhaust gas passes from the collector to the interior of the catalyst without significant expansion or contraction, and hence with minimal pressure loss.

Exhaust gas and entrained urea decomposition products enter the open front axial end of the distribution channel and pass radially outward through the catalyst whose catalytic material promotes chemical reaction. The treated gas leaves through the outer surface of the catalyst which is spaced inward of side wall portion 38B to provide an annular space 56 surrounding the catalyst along its length. The axial end of the catalyst confronting exit wall portion 38C is spaced from that wall to provide a space 58 that is open to outlet 42. Collectively, spaces 56 and 58 collect the exiting gas flow within housing 38 for removal through outlet 42.

Figure 4:
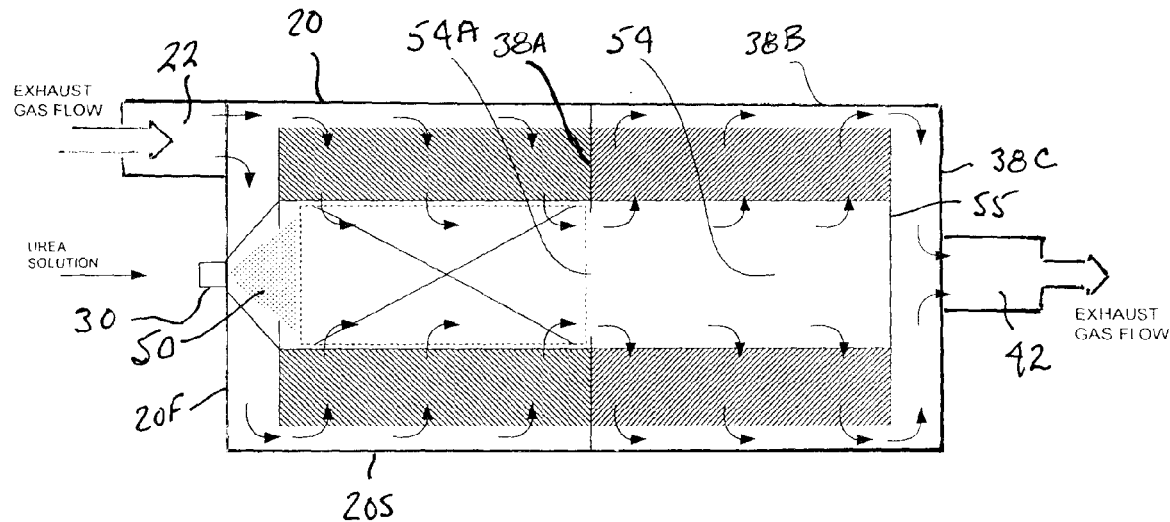
FIG. 4 is a diagram that shows a fourth embodiment of after-treatment system of the present disclosure.

An SCR catalyst arranged for radial flow, as in FIGS. 3 and 4, can be made of ceramic or metallic foam, or fleece, coated with a material active in selective catalytic reduction of $NO_X$. Alternatively, it can be made of a uniform material that combines functions of both support and active catalyst material. The gas distribution channel within the catalyst may have a permeable wall that can be used to retain the catalyst in place.

The SCR catalyst can be made in a combination of layers of different properties in order to accomplish pressure and gas flow distribution. The outward layer of the SCR catalyst may be coated with an ammonia oxidation (clean-up) catalyst that reduces excessive ammonia slip.

An example of one particular construction of an SCR catalyst arranged for axial flow, as in FIGS. 1 and 2 has a standard, straight-channel monolith design. Other alternative constructions may of course be used.

In another "single-can" embodiment shown in FIG. 4, both filter element 24 and catalyst 40 are housed together with wall portion 38A serving as an internal partition between them. The partition contains a central orifice 54A that provides for gas flow to pass through from one collector to the other as suggested by the unnumbered arrows. Orifice 54A is made to be smaller in diameter than the collectors to aid in resisting passage of any liquid that may be present on the wall of collector 26 through to the catalyst.

Because of the novel organization and arrangement of a urea injector and associated radial flow particulate filter that have been described here, not only is improved packaging provided but also the ability to expand the useful operating range of urea SCR diesel after-treatment systems, especially extending the range toward lower temperatures that typically occur during stop-and-go vehicle operation, low engine speeds and loads, and during winter conditions. Such systems can be useful in achieving compliance with increasing stricter regulations on tailpipe emissions.

What is claimed is:

1. An internal combustion engine comprising an exhaust system through which exhaust gas created by combustion in engine combustion chambers passes to atmosphere and which comprises an after-treatment system comprising a first after-treatment device and a second after-treatment device that treat the exhaust gas before the exhaust gas leaves the exhaust system, wherein the first after-treatment device comprises:

an inlet through which exhaust gas enters the first after-treatment device and an outlet through which exhaust gas that has passed through the first after-treatment device exits the first after-treatment device;

a radial flow particulate filter element that is disposed in circumscribing relationship to an axially extending collector to filter particulate matter from exhaust gas that has entered the first after-treatment device through the inlet before the exhaust gas enters and flows axially through the collector; and an injector for injecting material useful in accomplishing treatment of the exhaust gas into an axial end of the collector for entrainment with exhaust gas flow axially through the collector;

the first after-treatment device comprising an axially extending side wall circumscribing, and cooperating with an outer surface of the filter element to provide a path for exhaust gas that has entered the first after-treatment device through the inlet to flow axially along a radially outer surface of the filter element before entering the filter element through the filter element's radially outer surface, and a front end wall that closes a front axial end of the side wall;

the injector being disposed centrally at the front end wall and comprising a nozzle which is disposed on an axial centerline of the collector for injecting material useful in accomplishing treatment of the exhaust gas into the collector for prevailing flow in an axial direction through the collector;

the inlet being disposed radially offset to the injector for introducing exhaust gas inside the front end wall and the outlet being disposed at an axial end of the collector on the axial centerline of the collector;

the collector comprising a permeable wall that is disposed against the radially inner surface of the filter element to provide support of the filter element while allowing exhaust gas passing out of the filter element through the filter element's radially inner surface to pass through the permeable wall and enter the collector for axial flow through the collector to the outlet;

a straight pipe extending from the outlet for conveying axial flow from the collector to an inlet of the second after-treatment device;

and wherein: the second after-treatment device comprises an axial flow SCR catalyst in axial alignment with the straight pipe providing for axial flow of exhaust gas from the collector through the SCR catalyst, wherein the second after-treatment device comprises a frustoconical entrance wall portion extending with increasing taper from the straight pipe to the SCR catalyst and a frustoconical exit wall portion extending with decreasing taper from the SCR catalyst.

2. An exhaust after-treatment system for an internal combustion engine exhaust system through which exhaust gas created by combustion in engine combustion chambers passes to atmosphere, the exhaust after-treatment system comprising a first after-treatment device and a second after-treatment device that treat the exhaust gas before the exhaust gas leaves the exhaust system, wherein the first after-treatment device comprises:

an inlet through which exhaust gas enters the first after-treatment device and an outlet through which exhaust gas that has passed through the first after-treatment device exits the first after-treatment device;

a radial flow particulate filter element that is disposed in circumscribing relationship to an axially extending collector to filter particulate matter from exhaust gas that has entered the first after-treatment device through the inlet before the exhaust gas enters and flows axially through the collector; and an injector for injecting material useful in accomplishing treatment of the exhaust gas into an axial end of the collector for entrainment with exhaust gas flow axially through the collector;

the first after-treatment device comprising an axially extending side wall circumscribing, and cooperating with an outer surface of the filter element to provide a path for exhaust gas that has entered the first after-treatment device through the inlet to flow axially along a radially outer surface of the filter element before entering the filter element through the filter element's radially outer surface, and a front end wall that closes a front axial end of the side wall;

the injector being disposed centrally at the front end wall and comprising a nozzle which is disposed on an axial centerline of the collector for injecting material useful in accomplishing treatment of the exhaust gas into the collector for prevailing flow in an axial direction through the collector;

the inlet being disposed radially offset to the injector for introducing exhaust gas inside the front end wall and the outlet being disposed at an axial end of the collector on the axial centerline of the collector;

the collector comprising a permeable wall that is disposed against the radially inner surface of the filter element to provide support of the filter element while allowing exhaust gas passing out of the filter element through the filter element's radially inner surface to pass through the permeable wall and enter the collector for axial flow through the collector to the outlet;

a straight pipe extending from the outlet for conveying axial flow from the collector to an inlet of the second after-treatment device;

and wherein the second after-treatment device comprises:
an axial flow SCR catalyst in axial alignment with the straight pipe providing for axial flow of exhaust gas from the collector through the SCR catalyst, wherein the second after-treatment device comprises a frustoconical entrance wall portion extending with increasing taper from the straight pipe to the SCR catalyst and a frustoconical exit wall portion extending with decreasing taper from the SCR catalyst.

* * * * *